United States Patent
Swinderman

(10) Patent No.: US 7,424,945 B2
(45) Date of Patent: Sep. 16, 2008

(54) CONVEYOR BELT CLEANER REPLACEABLE SCRAPER BLADE TIP AND POCKET AND METHOD OF MANUFACTURING SAME

(75) Inventor: Robert Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 11/553,036

(22) Filed: Oct. 26, 2006

(65) Prior Publication Data

US 2007/0089968 A1 Apr. 26, 2007

Related U.S. Application Data

(60) Provisional application No. 60/730,464, filed on Oct. 26, 2005.

(51) Int. Cl.
*B65G 45/12* (2006.01)
(52) U.S. Cl. .................................................. 198/497
(58) Field of Classification Search ............... 198/497, 198/498, 499
See application file for complete search history.

(56) References Cited

U.S. PATENT DOCUMENTS

| | | | |
|---|---|---|---|
| 4,658,949 A | | 4/1987 | Reicks |
| 4,917,231 A | | 4/1990 | Swinderman |
| 5,011,002 A | * | 4/1991 | Gibbs .................. 198/497 |
| 5,016,746 A | * | 5/1991 | Gibbs .................. 198/499 |
| 6,401,911 B1 | | 6/2002 | Swinderman |
| 6,439,373 B1 | | 8/2002 | Swinderman |
| 6,457,575 B2 | * | 10/2002 | Swinderman .......... 198/499 |
| 6,581,754 B2 | * | 6/2003 | Law ..................... 198/499 |
| 6,619,469 B2 | * | 9/2003 | Malmberg ............. 198/497 |
| 6,695,123 B2 | * | 2/2004 | Stoll ..................... 198/499 |
| 6,926,133 B2 | * | 8/2005 | Kolodziej et al. ...... 198/498 |
| 6,929,112 B2 | * | 8/2005 | Hall ..................... 198/499 |
| 7,225,916 B2 | * | 6/2007 | Yoshizako et al. ..... 198/497 |

OTHER PUBLICATIONS

European Search Report, dated Jan. 31, 2007, in connection with application No. EP 06 291 639.0, which, like the subject U.S. Appl. No. 11/553,036, claims priority to U.S. Appl. No. 60/730,464.
Martin Engineering, MARTIN SHD Belt Cleaner Technical Data, 4 pages, bearing 1998, 2005 and 2006 copyright dates.
Martin Engineering, MARTIN SHD Belt Cleaner and Tensioner Operator Manual, 59 pages, bearing 1998 and 2003 copyright dates.
Martin Engineering, MARTIN ZHD Belt Cleaning System Technical Data, 2 pages, bearing 2002 and 2006 copyright dates.
Martin Engineering, MARTIN ZHD Belt Cleaner and Tensioners Operator Manual, 38 pages, bearing a 2001 copyright date.

* cited by examiner

*Primary Examiner*—Mark A Deuble
(74) *Attorney, Agent, or Firm*—Thompson Coburn LLP

(57) ABSTRACT

A removable scraper blade tip and reusable pocket for a conveyor belt cleaner comprises a scraper blade with leg portions adapted to be releasably received by receiving compartments in a pocket member that is permanently affixed to a support frame. The scraper blade tip is press fit into the pocket and secured with the use of a self-locking mounting pin. Removal of the scraper blade tip requires removal of the mounting pin and applying a force to the scraper blade tip to break the press fit. A new scraper blade tip may be inserted with the pocket and secured with the mounting pin.

8 Claims, 5 Drawing Sheets

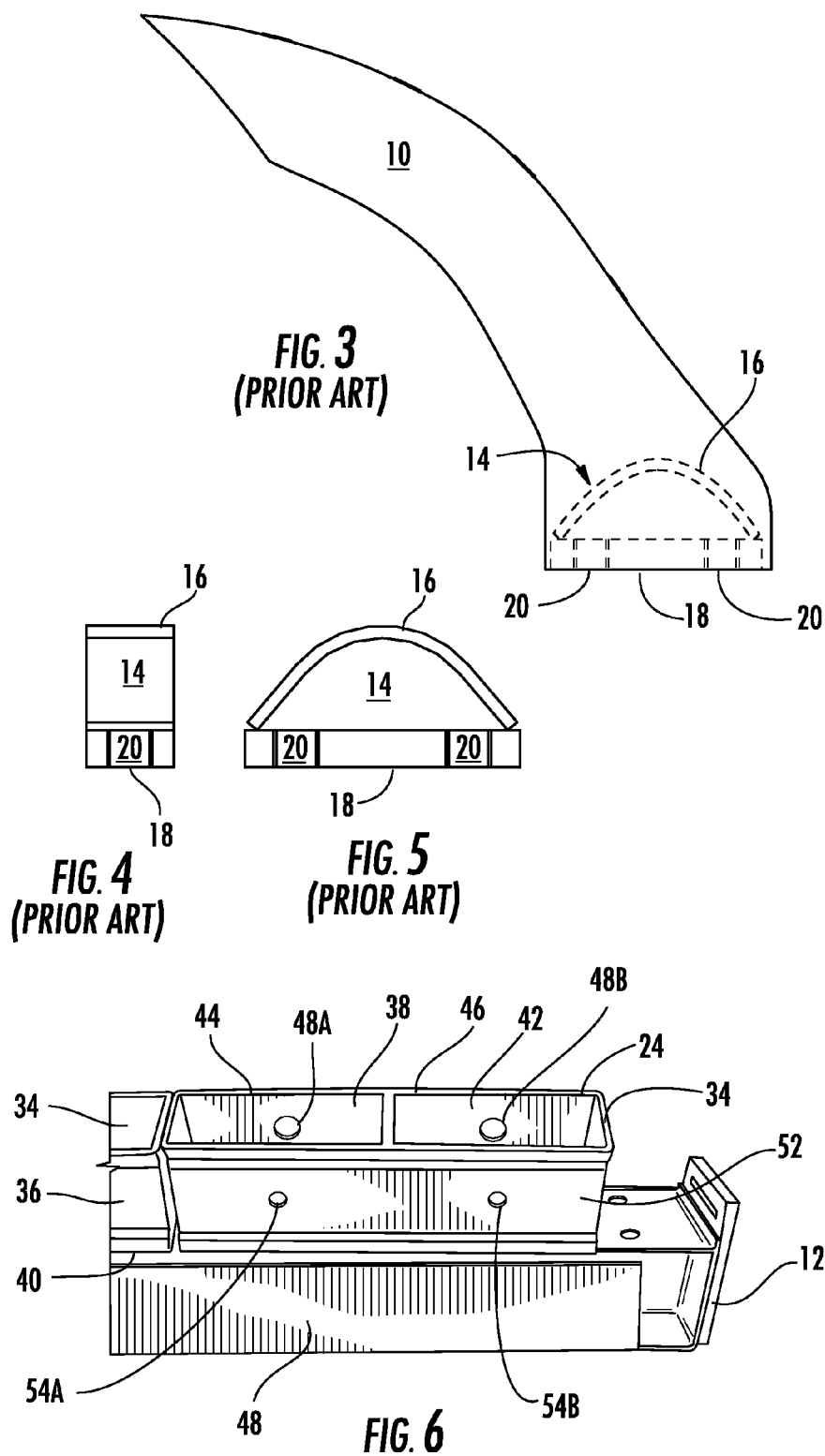

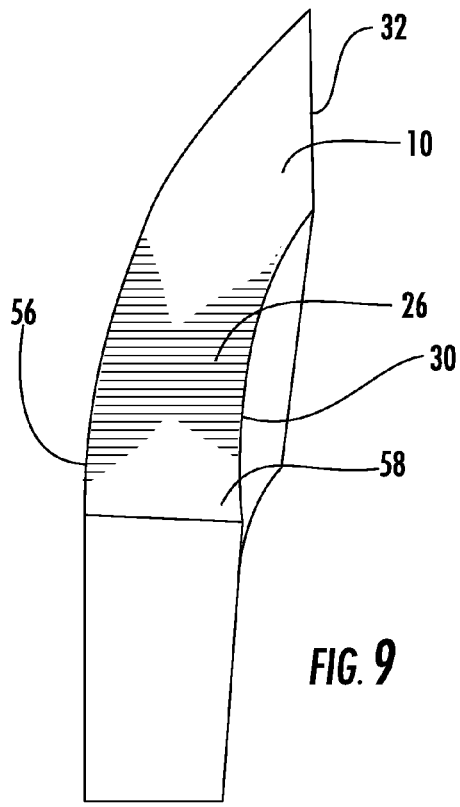
FIG. 9
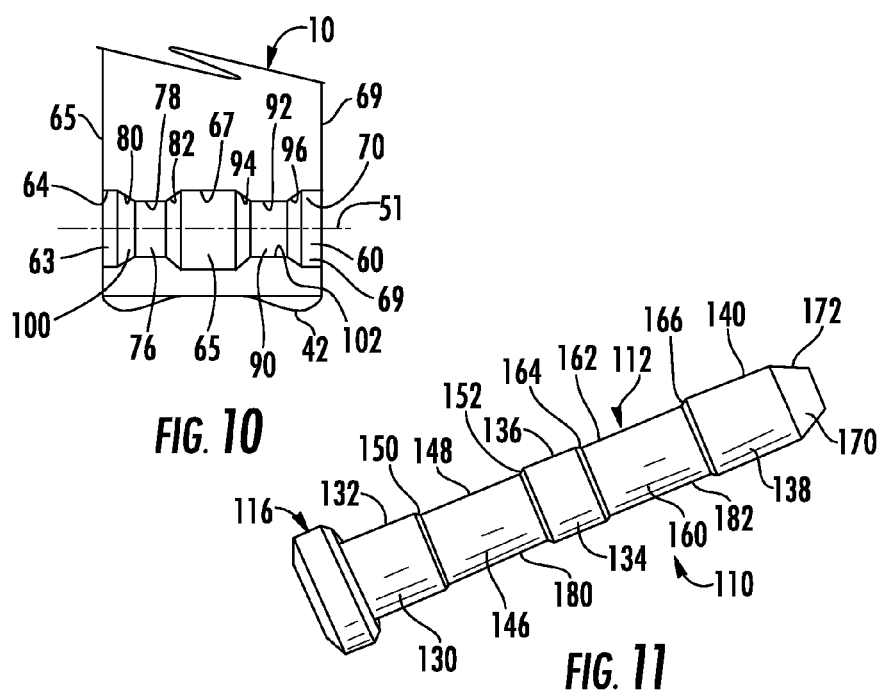
FIG. 10
FIG. 11

CONVEYOR BELT CLEANER REPLACEABLE SCRAPER BLADE TIP AND POCKET AND METHOD OF MANUFACTURING SAME

CROSS-REFERENCE TO RELATED APPLICATIONS

This application claims the benefit of U.S. provisional application No. 60/730,464 filed on Oct. 26, 2005.

BACKGROUND OF THE INVENTION

1. Field of the Invention

The present invention relates to conveyor belt cleaners for use in connection with conveyor belts used for handling bulk solid materials or unit handling, and more specifically to conveyor belt scraper blades incorporating a permanent pocket associated with the conveyor belt cleaner cross-shaft and using removable and replaceable scraper blade tips that securely insert within the pocket.

2. Description of Related Art

Conveyor belt cleaners are used to remove materials that cling to the return run of conveyor belts after the belt has discharged its cargo. The cargo can be units such as letters or cartons or bulk solid materials including sand or gravel. The bulk solid materials that do not discharge from the belt at the desired discharge location through the action of gravity or centrifugal force accumulates on components of the belt cleaner or the conveyor belt surface causing productivity, cleanliness or safety problems. Conveyor belt cleaners are designed to be used with conveyor belts of various widths and speeds including use on very side, fast moving belts such as the MARTIN® SHD™ Belt Cleaner. A typical wide, high speed conveyor belt is 2.8 m (110 in.) in width and travels at approximately 7.5 m/s (1500 ft/min).

Referring to FIG. 1, prior art belt cleaners for side, fast moving belts 8 embody a unitary urethane scraper blade 10 with a metal insert or inserts cast into the base of the blade to facilitate attachment of the blade to the support frame 12. The inserts 14, shown in detail in FIGS. 2-5, are fabricated metal inserts comprising a horse-shoe shaped upper section 16 and a base portion 18. The upper section 16 allow the urethane material to flow through as the blade 10 is being cast, creating a mechanical lock between the insert 14 and the blade 10. The base portion 18 includes threaded apertures 20 located to align with apertures (not shown) in the support frame 12 (FIG. 1) and configured to receive correspondingly threaded bolts 22 (FIG. 1) for securing the scraper blade 10 to the support frame 12. The number of inserts used correlates to the blade width. Several blades are mounted in line on the support frame to crate a single unitary blade. The blades must be precisely positioned to prevent gaps or misalignment in the blades which could trap foreign material or allow the material adhering to the belt to create a hydroplaning action between the scraper blades and the conveyor belt. For these reasons, the holes in the support frame and location of the inserts in the blades must be within a close tolerance of a few millimeters.

There have been several attempts to design a blade with a replaceable tip and reusable base made from urethane or reinforced urethane. With smaller belt cleaner blades it is possible to design such a system; the Roxon™ ECO-BLADE™ is one system designed for smaller belt cleaners. However, the extreme conditions and high forces involved is super heavy duty installations have lead to failed attempts to use a urethane base and replaceable tip.

The arrangement shown in FIGS. 1-5 exhibits many drawbacks. First, the inserts in this design are not easily removed from the blade for purposes of recycling or reuse with a different scraper blade. Moreover, the inserts must be precisely placed into the mold while the blade is cast to maintain proper alignment with the bolt holes in the support frame. Additionally, the support frame is biased to adjust the position of the scraper blade to maintain engagement between the scraper blade and conveyor belt surface as the blade wears down. Accordingly, the distance the support frame is located from the conveyor belt is determined by the size and position of the insert location within the blade to prevent the metal of the insert from coming into contact with the belt surface in the event the blade wears down beyond its useful life.

The present inventive scraper blade addresses these and other concerns associated with the prior art.

BRIEF SUMMARY OF THE INVENTION

A preferred embodiment of the conveyor belt cleaner system for cleaning a surface of conveyor belt comprises: a support frame comprising a top surface; a pocket extending from the top surface of the support frame, the pocket comprising a front and back wall and sidewalls defining a pocket space, the front and back walls each comprising a concentrically aligned mounting bore; a removable scraper blade tip comprising a scraping portion and a first mounting leg extending from the scraper blade tip and adapted to be received by the pocket and comprising a receptor extending between a front and back surface of the mounting leg, the scraper blade tip movable between a first position and second position where the receptor is substantially concentrically aligned with the front and back wall mounting bores to form a through hole configured to receive and capture a fastener adapted to be removeably inserted within the through hole when the scraper blade tip is in the second position.

The conveyor belt cleaner system of further comprises a front flange extending from the support frame towards the front wall. The front flange comprises an access bore substantially concentrically aligned with the mounting bore in the front wall. In the conveyor belt cleaner system, the pocket extends from the top surface of the support frame at an angle with respect to the top surface and the pocket is comprised of metal.

In another embodiment, a support frame for a conveyor belt cleaner for cleaning a surface of conveyor belt comprises: a top surface; and a pocket extending from the top surface. The pocket comprises a front and back wall and sidewalls of metal. The front and back walls each comprise a concentrically aligned mounting bore; a pocket space defined by the front and back wall and sidewalls with the pocket space configured to receive the base portion of a scraper blade tip, and wherein the scraper blade tip comprises a receptor that concentrically aligns with the mounting bore to form a through hole for receiving the fastener configured to releasably secure the scraper blade tip within the pocket space.

Another embodiment of the invention comprises a method of assembling a conveyor belt cleaner for cleaning a surface of a conveyor belt comprising: (a) providing a support frame comprising: a top surface; (b) providing a pocket extending from the top surface of the support frame, the pocket comprising a front and back wall and sidewalls defining a pocket space; (c) boring concentrically aligned mounting bores in the front and back walls; (d) providing a removable scraper blade tip comprising a scraping portion and a first mounting leg extending from the scraper blade tip and adapted to be received by the pocket; (e) boring a receptor into the first mounting leg, the receptor extending from a front surface of the mounting leg to a back surface of the mounting leg; (f) inserting the mounting leg within the pocket space until the receptor is substantially concentrically aligned with the front and back wall mounting bores forming a through hole; and (g) providing a mounting pin adapted to be removably inserted within the through hole formed by the front and back wall bores to secure the scraper blade tip within the pocket. While a particular order of steps are stated in the foregoing examples of methods, other variations in steps or the order in which they are performed should be deemed as being within the scope of the invention.

BRIEF DESCRIPTION OF THE SEVERAL VIEWS OF THE DRAWINGS

FIG. 3 shows a side elevation view of a prior art conveyor belt scraper blade;

FIG. 4 shows a front elevation view of a component of a prior art conveyor belt scraper blade;

FIG. 5 shows a side elevation view of a component of a prior art conveyor belt scraper blade;

FIG. 6 shows front and top perspective view of the pocket member of the inventive replaceable scraper blade tip and pocket;

FIG. 9 shows a bottom and side perspective view of the scraper blade tip of the present inventive replaceable scraper blade tip and pocket;

FIG. 10 is a cross-sectional view of a portion the base member of the pin mounting arrangement;

FIG. 11 is a perspective view of the self-locking pin of the pin mounting arrangement;

DETAILED DESCRIPTION OF THE INVENTION

Figure 1:
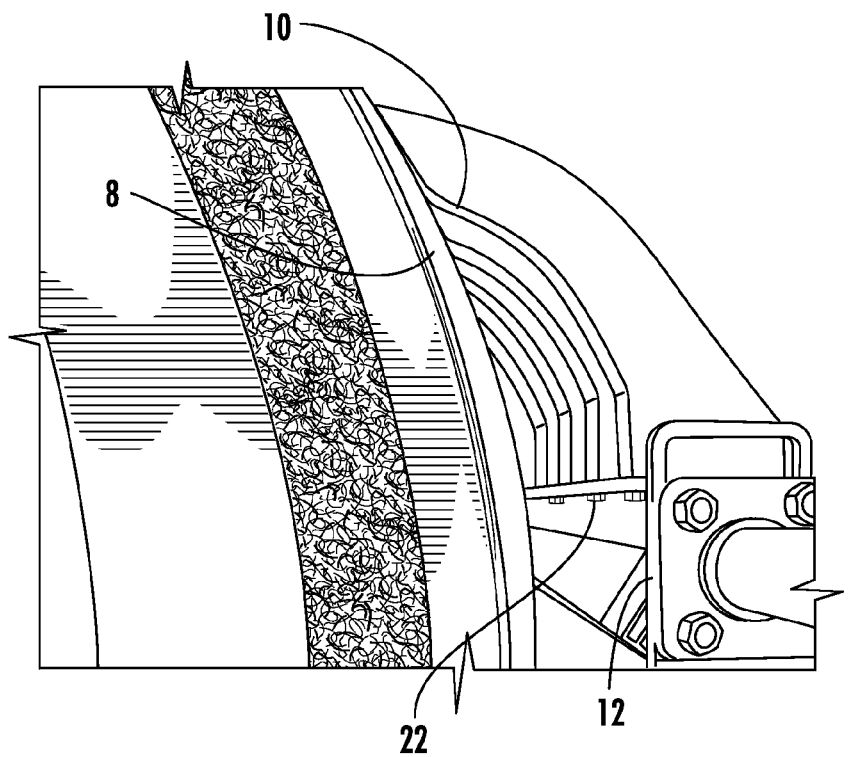
FIG. 1 shows a side perspective view of a prior art conveyor belt scraper blade.
Figure 2:
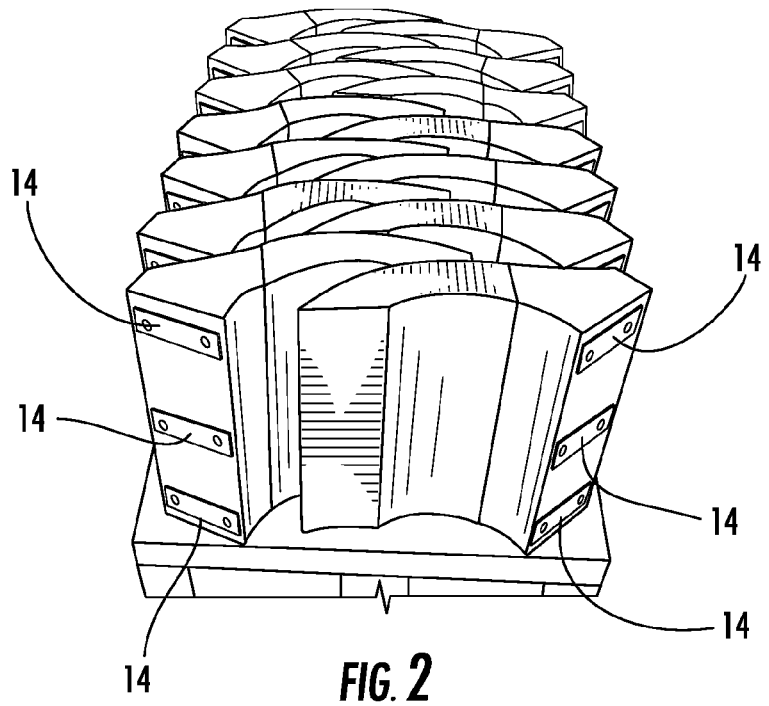
FIG. 2 shows a bottom perspective view of a plurality of prior art conveyor belt scraper blades.

FIGS. 6-13 show an inventive replaceable scraper blade tip and pocket for a conveyor belt cleaner comprising a pocket 24 associated with a support frame 12 comprising a cross-shaft, and a urethane scraper blade tip 10 with a body portion 26 and mounting legs 28, 30 extending therefrom to secure the scraper blade 10 within the pocket 24. The scraper blade tip 10 further comprises an upper, scraping portion 32 configured to engage the outer surface of the conveyor belt 8 (FIG. 1). The support frame 12, and in turn the scraper blade tip 10, is biased towards the conveyor belt 8 (FIG. 1) to maintain engagement of the scraping portion 32 against the conveyor belt 8 (FIG. 1).

Turning to FIG. 6, the pocket 24 and support frame 12 assembly is shown. The pocket 24 comprises two opposing sets of sidewalls 34, 36 that can be mounted to or integrally fabricated with the support frame 12 to form a pocket space 38. The first set of sidewalls 34 comprises a front wall 40 and back wall 42 of the pocket 24. The sidewalls join together and mount to the support frame with a draft angle of preferably 5 degrees. It is, however, contemplated that a draft angle between 1 deg. and 5 deg. is suitable for purposes of the present invention.

Figure 7:
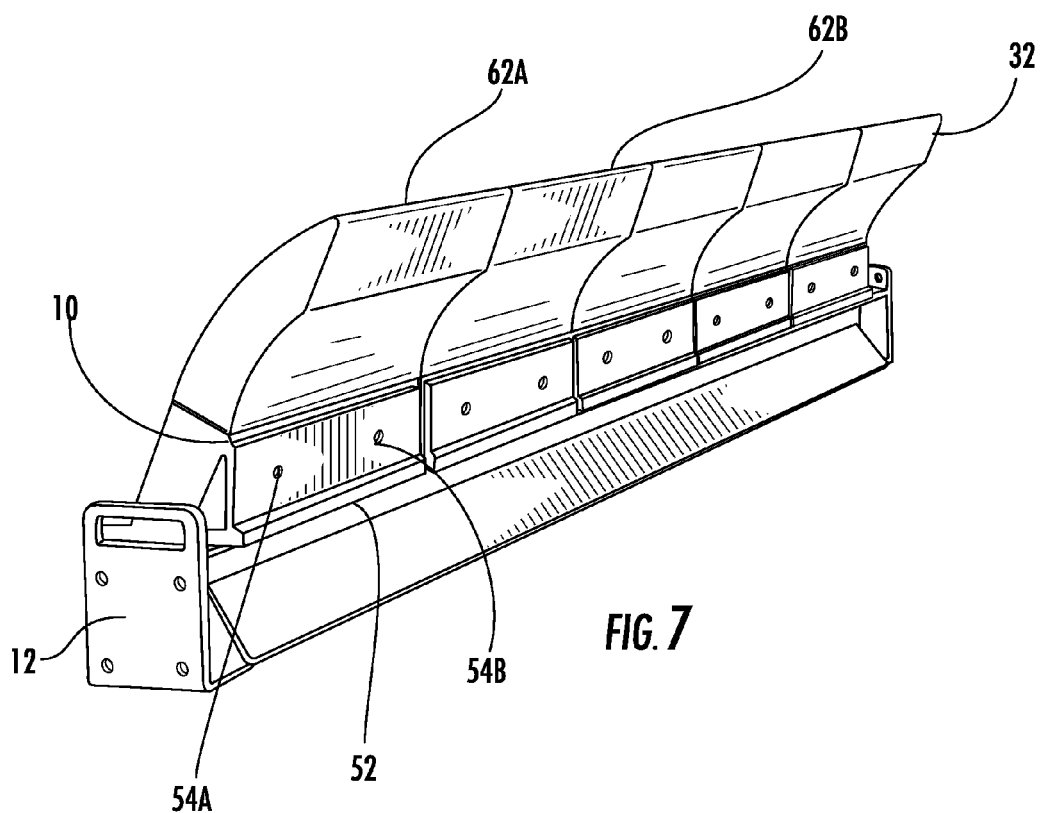
FIG. 7 shows side and front perspective view of the inventive replaceable scraper blade tip and pocket.

Additionally, as is seen in FIG. 7, the pocket 24 is mounted on an angle, with respect to the top surface of the support frame 12, towards the conveyor belt 8 (FIG. 1). The angled mounting of the pocket 24 aids in properly biasing the scraper blade tip 10 into scraping engagement with the conveyor belt 8 (FIG. 1). In FIG. 7, the mount angle is 60 deg. from horizontal. However, the mount angle is a function of the mounting geometry at the installation site and ranges from any position from horizontal, depending on the particular geometry and installation location.

The pocket 24 can be made from a variety of materials such as hot rolled, steel, stainless steel, cast iron, aluminum, or a high strength reinforced plastic. When the pocket 24 is fabricated from metal, the rotation of the support frame 12 is limited to prevent the top edge of the front wall 40 from the contacting the conveyor belt surface as the scraper blade tip 10 wears down to prevent abrasion of or damage to the conveyor belt surface. This is accomplished by disposing a stop member (not shown) on the support frame 12.

Figure 8:
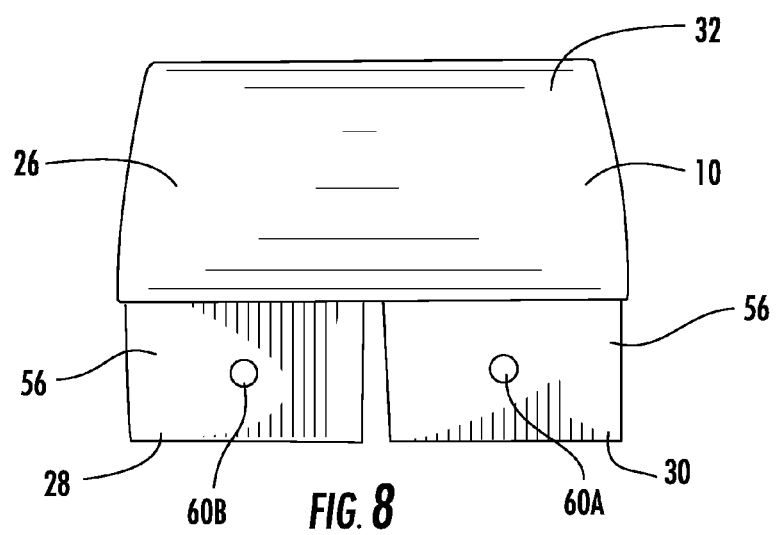
FIG. 8 shows and elevation view of the scraper blade top of the present inventive replaceable scraper blade tip and pocket.

In the present embodiment of the invention, the pocket space 38 is divided into a first and second receiving compartment 44, 46 by a transversely disposed divider 48. The first and second receiving compartments 44, 46 are adapted to receive the first and second mounting legs 28, 30 of the scraper blade tip 10 (FIG. 8). The pocket 24 and scraper blade tip 10 are designed with draft angles so the tip fits tightly into the pocket with a friction or press fit.

The front and back walls 40, 42 also include mounting bores 47 (FIG. 13), 48A, B associated with each receiving compartment 44, 46. As is seen in FIG. 6, a front flange 52 extends from the support frame 12 and abuts the front wall 40 of the pocket 24 towards the top edge of the front wall 40. The front flange 52 includes access bores 54A, B that are substantially concentric with the mounting bores 47 (FIG. 13) in the front wall 40 for accessing the fasteners 110 (FIG. 13), as will be discussed in detail.

Turning to FIGS. 8-10, the scraper blade tip 10 comprises an upper portion 32 including the scraping edge, a body portion 26, and the first and second mounting legs 28, 30 extending from the bottom of the body portion 26. Each mounting leg 28, 30 comprises a front 56 and back 58 surface and a receptor 60A, B extending there between with a central axis 51. When the mounting legs 28, 30 are removably secured within the receiving compartments 44, 46 (FIG. 6), the receptors 60A, B align with and are concentric with the mounting bores 47 (FIG. 13) 48A, B on the front 40 and back 42 walls of the pocket 24, thereby forming coaxially aligned through holes 62A, B (FIG. 7), each for removably receiving a fastener 110 (FIGS. 11 and 12) to releasably secure the scraper blade tip 10 within the pocket 24.

Figure 12:
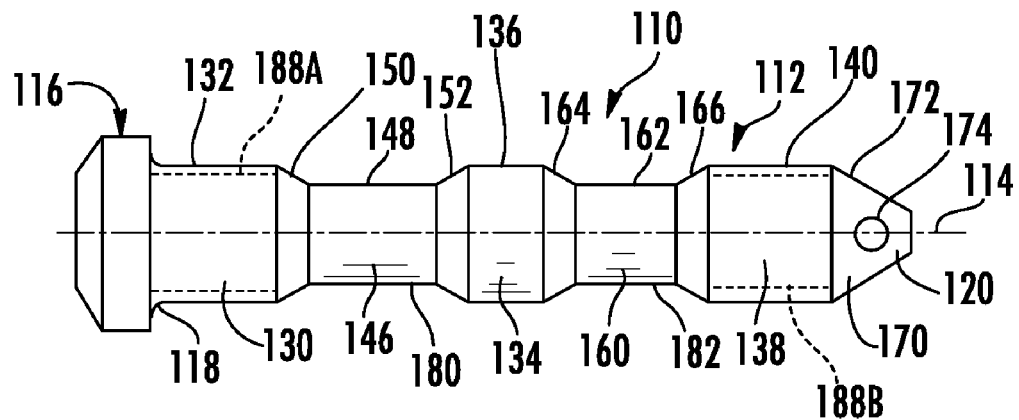
FIG. 12 is a side elevational view of the self-locking pin.

In a preferred embodiment of the present inventing, the fasteners 110 comprise self-locking, mounting pins 110 (FIGS. 11 and 12). Each receptor 60A, B includes a first generally cylindrical chamber 63 formed by a generally cylindrical sidewall 64. The first cylindrical sidewall 64 extends inwardly into the mounting leg 28, 30 from a first side surface 65 and is located generally concentrically about the axis 51. The receptor 60A, B includes a second generally cylindrical chamber 66 formed by a second generally cylindrical sidewall 67 that extends generally concentrically about the axis 51. The second cylindrical chamber 66 and the second cylindrical sidewall 67 are generally located midway between the first side surface 66 and the second side surface 68 of the scraper blade 10. Each receptor 60A, B includes a third generally cylindrical chamber 69 that is formed by a third generally cylindrical sidewall 70 which extends generally concentrically about the axis 51. The third cylindrical chamber 69 and third cylindrical sidewall 70 extend inwardly into the mounting legs 28, 30 from the second side surface 68. The first, second and third cylindrical chambers 63, 65 and 69 and the first, second and third cylindrical sidewalls 64, 67 and 70 each preferably have the same diameter.

Each receptor 60A, B includes a fourth generally cylindrical chamber 76 formed by a fourth generally cylindrical sidewall 78 that extends generally concentrically about the axis 51. The fourth cylindrical chamber 76 and the fourth cylindrical sidewall 78 are located along the axis 51 generally midway between the first cylindrical chamber 63 and the second cylindrical chamber 65. A generally conical transitional wall 80 extends from the first cylindrical sidewall 64 inwardly to the fourth cylindrical sidewall 78. A generally conical transitional sidewall 82 extends outwardly from the fourth cylindrical sidewall 78 to the second cylindrical sidewall 67. The transitional sidewalls 80 and 82 extend generally concentrically about the axis 51 and are preferably inclined at an angle of the approximately thirty degrees to the axis 51.

Each receptor 60A, B also includes a fifth generally cylindrical chamber 90 formed by a fifth generally cylindrical sidewall 92 that extends concentrically about the axis 51. The fifth cylindrical chamber 90 and the fifth cylindrical sidewall 92 are located approximately midway between the second cylindrical sidewall 67 and the third cylindrical sidewall 70. A generally conical transitional sidewall 94 extends inwardly from the second cylindrical sidewall 67 to the fifth cylindrical sidewall 92. A generally conical transitional sidewall 96 extends outwardly from the fifth cylindrical sidewall 92 to the third cylindrical sidewall 70. The transitional sidewalls 94 and 96 extend generally concentrically about the axis 51 and are preferably inclined at an angle of approximately thirty degrees to the axis 51. The diameter of the fifth cylindrical sidewall 92 is equal to the diameter of the fourth cylindrical sidewall 78. The diameter of the fourth cylindrical sidewall 78 and the fifth cylindrical sidewall 92 is shorter than the diameter of the cylindrical sidewalls 64, 67 and 70 by a distance such as approximately 1.5 mm or one-sixteenth of an inch. Each receptor 60A, B includes a first inwardly projecting annular rib 100 formed by the cylindrical sidewall 78 and the transitional walls 80 and 82, and includes a second inwardly projecting annular rib 102 formed by the cylindrical sidewall 92 and the transitional walls 94 and 96.

The self-locking pins 110 (FIGS. 11 and 12) are typically made from stainless steel and are similar to those disclosed and claimed in U.S. Pat. No. 6,457,575 to Swinderman and assigned to the assignee of this application. The disclosure of the U.S. Pat. No. 6,457,575 is incorporated by reference herein. Insertion of the pins prevents the scraper blade tip 10 from 15 being accidentally dislodged from the pocket 24 during use of conveyor belt cleaner.

Each self-locking mounting pin 110 includes a shank 112 having a generally linear central axis 114 and a head 116. The shank 112 extends along the axis 114 between a first end 118 and a second end 120. The head 116 is attached to the first end 118 of the shank 112. The shank 112 includes a first generally cylindrical portion 130 having a first generally cylindrical surface 132 at the first end 118 which extend generally concentrically about the axis 114. The head 116 is attached to the first cylindrical portion 130. The shank 112 also includes a second generally cylindrical portion 134 having a second generally cylindrical surface 136 that is located concentrically about the axis 114. The shank 112 also includes a third generally cylindrical portion 138 having a third generally cylindrical surface 140 which is located generally concentrically about the axis 114. The second cylindrical portion 134 is located approximately midway between, and is spaced apart from, the first cylindrical portion 130 and the third cylindrical portion 138. The cylindrical portions 130, 134 and 138 and the cylindrical surfaces 132, 136 and 140 each have a uniform diameter approximately equal to or slightly smaller than the diameter of the cylindrical sidewalls 64, 67 and 70 of the receptor 60A, B of the mounting legs 28, 30.

The shank 112 also includes a fourth generally cylindrical portion 146 having a fourth generally cylindrical surface 148 located generally concentrically about the axis 114 and located 10 approximately midway between and spaced apart from the first cylindrical portion 130 and the second cylindrical portion 134. A generally conical transitional surface 150 extends inwardly from the first cylindrical surface 132 to the fourth cylindrical surface 148. A generally conical transition surface 152 extends outwardly from the fourth cylindrical surface 148 to the second cylindrical surface 136.

The shank 112 also includes a fifth generally cylindrical portion 160 having a fifth generally cylindrical surface 162 which is located generally concentrically about the axis 114 and which is located approximately midway between and spaced apart from the second cylindrical portion 134 and the third cylindrical portion 138. A generally conical transitional surface 164 extends inwardly from the second cylindrical surface 136 to the fifth cylindrical surface 162. A generally conical transitional surface 166 extends outwardly from the fifth cylindrical surface 162 to the third cylindrical surface 140. The transitional surfaces 150, 152, 164 and 166 are preferably inclined at an angle of approximately thirty degrees to the axis 114. The first cylindrical surface 148 and the fifth cylindrical surface 162 have the same diameter which is smaller than the diameter of the surfaces 132, 136 and 140 by a distance such as approximately one-sixteenth of an inch.

The shank 112 includes a truncated conical tip 170 having a conical surface 172. A generally cylindrical bore 174 is illustrated which extends through the tip 170 generally perpendicular to the axis 114. The shank 112 includes a first annular groove 180 that extends concentrically about the axis 114 and that is formed between the first cylindrical portion 130 and the second cylindrical portion 134 by the fourth cylindrical surface 148 and the transitional surfaces 150 and 152. The shank 112 also includes a second annular groove 182 which extends generally concentrically about eh axis 114 and that is formed between the second cylindrical portion 134 and the third cylindrical portion 138 by the fifth cylindrical surface 162 and the transitional surfaces 164 and 166. The first annular groove 180 is adapted to receive and interlock with the first annular rib 100 of the receptor 60A, B in the mounting legs 28, 30. The second annular groove 182 is adapted to receive and interlock with the second annular rib 102 of the receptor 60A, B in base member 40. The mounting bores 47, 48 in the front and back walls 40, 42 are preferably slightly larger in diameter than the diameter of the cylindrical surfaces 12, 136 and 140 of the pin 110. If desired the cylindrical portions and the conical portions of the pin 110 and the receptors 60A, B may be formed in a generally rectangular or other polygonal cross-sectional shape.

The scraper blade tip 10 is formed from a resilient elastomeric material, such as a rubber or urethane, and is preferably polyurethane. The receptors 60A, B are formed by molding a cavity within the blade that corresponds to the geometry of the fasteners 110. One method of forming the receptors 60A, B is by inserting a pin in the mold and allowing the urethane to flow around it and cure. The pin can be easily removed when the blade tip 10 is still hot from the molding process. Removal of the pin when the blade tip 10 is at room temperature is more difficult.

Figure 13:
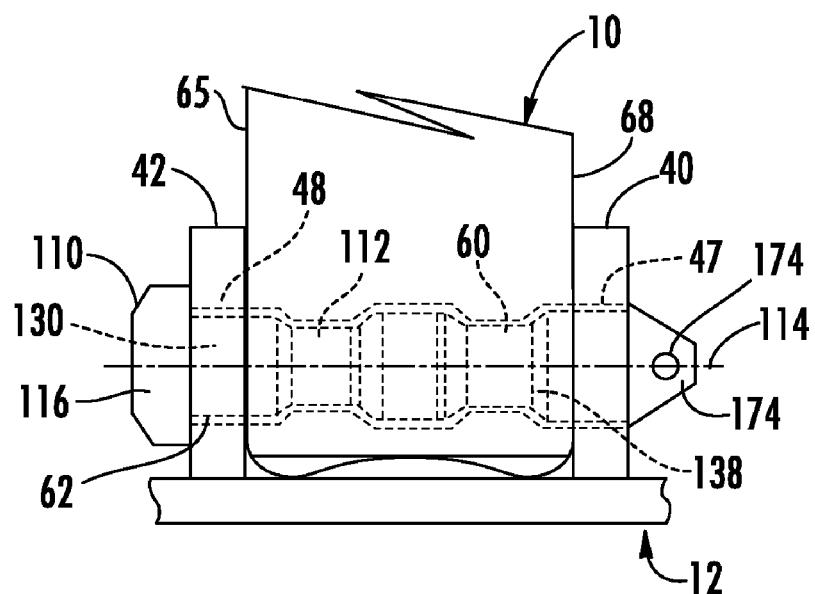
FIG. 13 is side elevational view, which is partially broken away, of the pin mounting arrangement of the present invention.

Referring to FIGS. 6, 7 and 13, during operation, the scraper blade tip 10 is press fit into the pocket space 38. The mounting legs 28, 30 are inserted within the receiving compartments 44, 46 until the receptors 60A, B align with the mounting bores 47, 48A, B on the front 40 and back 42 walls of the pocket 24 to form the through holes 62. To firmly secure the scraper blade tip 10 within the pocket space 38, self-locking mounting pins 110 are removably inserted within the through holes 62 as is shown in FIG. 13.

Removal and replacement of the scraper blade tip 10 involves reversing these steps. First, the self-locking mounting pins 110 are driven out of the remaining tip 10 with a punch inserted through the access bores 54A, B in the font flange 52 of the pocket 24. The tip 10 is then pried from the pocket 24 by inserting a chisel or screw driver in the blade at the intersection of the two legs of the tip and the top edge of the pocket 24. B driving the wedge into this space the scraper blade tip 10 is quickly released from its tapered locking fit within the pocket 24. The scraper blade tip 10 is then easily removed, the receiving compartments 44, 46 are cleaned and a new scraper blade tip 10 is inserted into the pocket 24 and secured with the original pins.

Of the many advantaged of the present inventive design, the present design reduces the amount of urethane used by 30% and eliminates the cast-in-place inserts of the prior art blade design which in turn reduces the replacement cost for the user. The present inventive design also reduces maintenance labor because the blade tips can be changed without unbolting the blades from the frame. Additionally, the replaceable scraper blade tips are 35% lighter than the prior art design.

The present inventive design also address problems present in prior art designs that utilize pockets cast from urethane or urethane with metal reinforcements embedded within. The use of all metal pockets reduces the cost and increases the life of the pocket. One significant issue addressed over the urethane pickets in the prior art is the failure and deformation under load over time of the urethane pockets. The required amount of metal to adequately reinforce the urethane is not cost effective. Additionally, the use of metal pockets enables the pockets to be fabricated as an integral part of the support frame, eliminating the need to bolt the pockets onto the support frame.

Other variations that would be contemplated by those skilled in the art are considered as being within the scope of the invention.

I claim:

1. A method comprising:
   removably connecting a conveyor system scraper blade to a support frame member via a pocket, the scraper blade comprising a blade tip and at least one leg portion at opposites ends thereof, the leg portion tapering as the leg portion extends generally away from the blade tip, the pocket comprising at least one wall that bounds a pocket space, the pocket also comprising an opening into the pocket space, the pocket space tapering as the pocket space extends away from the opening, the connecting comprising at least partially press-fitting at least part of the leg portion of the scraper blade into the pocket space of the pocket.

2. A method in accordance with claim 1 wherein the leg portion comprises a through-hole, the pocket comprises at least two coaxial holes that extend through the at least one wall, the through-hole of the leg portion is coaxial with the coaxial holes of the pocket when at least part of the leg portion of the scraper blade is press-fit into the pocket space of the pocket, and further comprising extending a pin through the through-hole of the leg portion and the coaxial holes of the pocket in a manner further connecting the scraper blade to the support frame member.

3. A method in accordance with claim 1 wherein the support frame member has a rectangular cross-section comprising four sides, and wherein the step of removably connecting the scraper blade to the support frame member is performed by translating the scraper blade along an axis relative to the pocket, the axis being non-parallel to any of the sides of the rectangular cross-section of the support frame member.

4. A method in accordance with claim 3 wherein the axis lies in a plane that is perpendicular to each of the sides of the rectangular cross-section of the support frame member.

5. A conveyor belt cleaner comprising:
   a scraper blade, the scraper blade being formed of a polymeric material and comprising a blade tip and at least one leg portion at opposites ends thereof, the leg portion tapering as the leg portion extends generally away from the blade tip;
   a support frame member; and
   a pocket, the pocket connecting the scraper blade to the support frame member, the pocket comprising at least one wall that bounds a pocket space, the pocket also comprising an opening into the pocket space, the pocket space tapering as the pocket space extends away from the opening, the leg portion of the scraper blade extending into the pocket space, at least a portion of the leg portion being press-fit against the at least one wall of the pocket.

6. A conveyor belt cleaner in accordance with claim 5 wherein the leg portion comprises a through-hole, the pocket comprises at least two coaxial holes that extend through the at least one wall, and the through-hole of the leg portion is coaxial with the coaxial holes of the pocket, and further comprising a pin that extends through the through-hole of the leg portion and the coaxial holes of the pocket.

7. A conveyor belt cleaner in accordance with claim 5 wherein the support frame member has a rectangular cross-section comprising four sides, and wherein the leg portion of the scraper blade and the pocket space of the pocket are shaped such that the leg portion is removable from the pocket space by translating the scraper blade along an axis relative to the pocket, the axis being non-parallel to any of the sides of the rectangular cross-section of the support frame member.

8. A conveyor belt cleaner in accordance with claim 7 wherein the axis lies in a plane that is perpendicular to each of the sides of the rectangular cross-section of the support frame member.

* * * * *